United States Patent [19]
Wilson

[11] 3,785,132
[45] Jan. 15, 1974

[54] GRAIN PICK UP

[76] Inventor: Duane L. Wilson, 240 N. 1st East, Richfield, Utah 84701

[22] Filed: June 1, 1972

[21] Appl. No.: 258,764

[52] U.S. Cl. .............................................. 56/364
[51] Int. Cl. ........................................... A01d 89/00
[58] Field of Search .................... 56/364; 17/11.1 R

[56] References Cited
UNITED STATES PATENTS

| 2,795,100 | 6/1957 | Sund | 56/364 |
| 3,126,693 | 3/1964 | Renn | 56/364 |
| 2,376,120 | 5/1945 | Campbell et al. | 17/11.1 R |
| 3,226,921 | 1/1966 | Shepley | 56/364 |

Primary Examiner—Antonio F. Guida
Attorney—B. Deon Criddle et al.

[57] ABSTRACT

A pick up unit mounted to and turned by a grain combine in advance of the feed reel of the combine to raise and position the grain. The pick up unit consists of a cylinder having a number of flexible fingers projecting from the outer wall thereof. The cylinder is rotated in the path of the moving combine so as to comb the flexible fingers upwardly through the stalks of a crop untangling and elevating the stalks prior to their contact with the bats of the combine feed reel. The feed reel bats in turn directs the crop stalks over a cutting blade secured to the combine.

2 Claims, 6 Drawing Figures

PATENTED JAN 15 1974 3,785,132

GRAIN PICK UP

BRIEF DESCRIPTION OF THE INVENTION

1. Field of the Invention

This invention relates to structures for use with combines to elevate and position stalks of a crop for a more efficient thrashing.

2. Prior Art

Many devices and mechanical arrangements intended to elevate and position grain carrying stalks of a crop have been proposed and have been sold as attachments for combines. Such devices comb the stalks of a grain crop upward into an erect attitude so that a following feed reel of a combine will have fully erected, separated stalks against which to turn. Combing the stalks into an erect attitude prevents the loss of grain from certain numbers of grain carrying stalks formerly wasted because they were matted or bent below the height of the turning bats of the combine pick up reel. The prior devices with which I am familiar have not been entirely successful since they use rigid bars or spikes rotated through the crop ahead of the pick up reel as the grain crop stalk elevating means. It has been found that such rigid appendages, while lifting the stalks, often tear through matted and tangled stalks with a resultant grain loss. The rigid appendages or the cylinder carrying them are also frequently damaged when they contact rocks and the like. This causes the turning cylinder or roller on which the appendage is mounted to bind against the obstruction causing damage thereto. Loose rocks or other such objects may be picked up and thrown into the combine or at workers by such rigid appendages.

SUMMARY OF THE INVENTION

The present invention does not use rigid bars or spikes that project outwardly from a rotating cylinder but instead uses a number of specially designed, spaced, resilient fingers that tend to comb rather than tear through tangled or matted grain carrying stalks and spring guides that direct the combed and raised stalks into the bat reel of a harvesting machine. The resilient fingers bend when contacting rocks or other solid objects, thereby avoiding damage to either the finger or to the cylinder to which it is mounted and the softer flexible fingers also have less tendency to knock grain from the stalks than do rigid members.

It is a principal object of the present invention to provide a pick up unit for use with a grain harvesting combine that will untangle and erect grain carrying stalks into the path of the bats of a turning combine pick up reel.

Another object is to provide a pick up unit having flexible grain stalk carrying members which will resiliently yield, rather than break when they contact solid objects and flexible stalk guides.

Still another object is to provide a pick up unit incorporating an arrangement of economically produced, outwardly projecting, resilient fingers that are individually, easily and economically replaced.

Principal features of the present invention include a pick up unit cylindrical body, journaled at its ends by mounting brackets that are connected to a combine harvester or the like. The unit is arranged to rotate in the path of travel of and in advance of the feed reel of the combine. The pick up unit body has a pulley thereon that is turned by a belt driven from a power source eminating from the combine. A number of outwardly projecting resilient fingers are mounted in staggered, spaced arrangement to extend from the outer wall of the body.

The fingers are each secured to the pick up unit cylindrical body by inserting an enlarged flexible head end thereof through appropriate holes formed in the body wall. The flexible heads deform to be inserted through the holes formed in the cylinder and once inside the cylinder they return to their original shape, thereby holding the fingers against undesired withdrawal. A groove is provided around each finger, adjacent to the head, and the grooved portions of the fingers fit closely through the holes in the body which are too small to allow passage of the adjacent body portions of the fingers so that the fingers cannot be forced further into the pick up unit body. Each flexible finger, opposite to its head, is formed with a number of shallow, peripheral grooves encircling the finger, which grooves act as guides for contacting grain carrying stalks to straighten and erect the stocks in preparation for their being engaged by a feed or pick-up reel.

Resilient guides are arranged to extend between transverse rows of fingers around the pick up unit cylinder body to hold the body a spaced distance from the ground. The guides extend towards the ground, below the cylinder body as it turns, but do not prevent ground engagement by the ends of the flexible fingers and direct stalks picked up by the fingers into the path of a trailing feed reel of a harvester.

Additional objects and features of the invention will become apparent from the following detailed description, taken together with the accompanying drawings.

THE DRAWINGS

FIG. 1 is a perspective view taken from the front and to one side of a combine harvester with the pick up unit of the present invention positioned beneath and in advance of a feed reel;

FIG. 2, an enlarged sectional view taken on the line 2—2 of FIG. 1;

FIG. 3, an enlarged, partially broken away, sectional view taken on the line 3—3 of FIG. 1;

FIG. 4, a front elevation view of a portion of the pick up cylinder of the present invention, as viewed on line 4—4 of FIG. 3;

FIG. 5, an enlarged vertical section view, taken along the line 5—5 of FIG. 3; and FIG. 6, a side elevation view of the pick up unit as viewed from the line 6—6 of FIG. 3.

DETAILED DESCRIPTION

Figure 1:
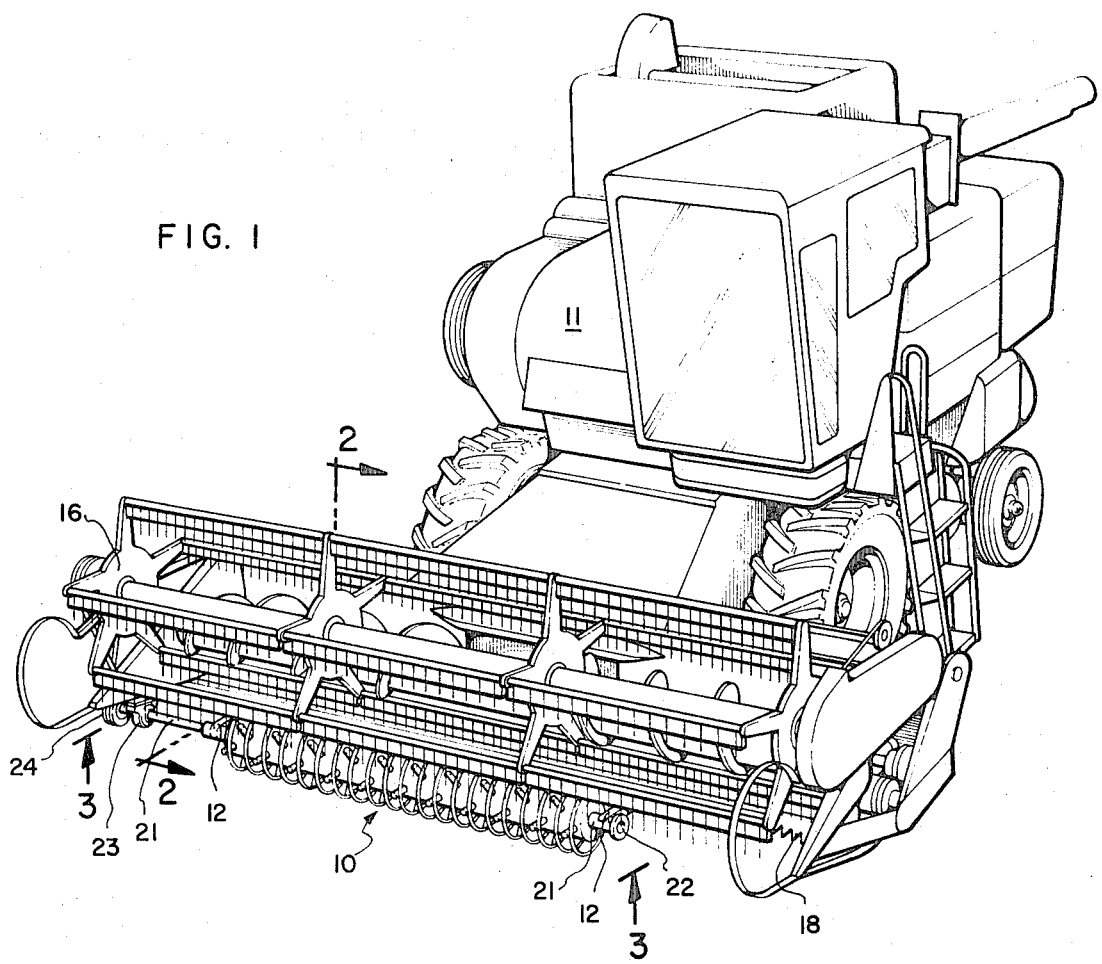

Referring now to the drawings:

In the illustrated preferred embodiment, the pick up unit of the invention, shown generally at 10, is shown in FIG. 1, mounted to the front of a combine harvester, shown generally at 11. The pick up unit 10 is supported by spaced arms 12 each of which is connected to a table housing 13 of the combine. An auger 14, contained within the table housing 13, is turned in conventional fashion to feed cut grain stalks into a grain elevator 15. A feed reel 16 is arranged to turn above the pick up unit 10 such that its bat ends 17 engage upstanding grain stalks and press them over a cutter bar 18 secured to the end of table housing 13.

Spaced pins 19 project from each of the arms 12 at one end thereof and are inserted through holes provided therefor in brackets 20 that extend downwardly from the table housing 13. Cotter keys 19a are inserted through holes in the ends of pins 19 to lock the arms 12 in position. The free ends of arms 12 have bearings 21 mounted therein.

An axle 22 of pick up unit 10 has its ends journaled through bearings 21 and has secured on one end thereof a collar 23 that prevents inadvertent removal of axle 22 from bearings 21. The other end of axle 22 opposite to collar 23 is also journaled through a driver bearing 24 that is secured to the combine frame. A driver pulley 25 is secured to the end of axle 22 opposite to collar 23.

Figure 2:
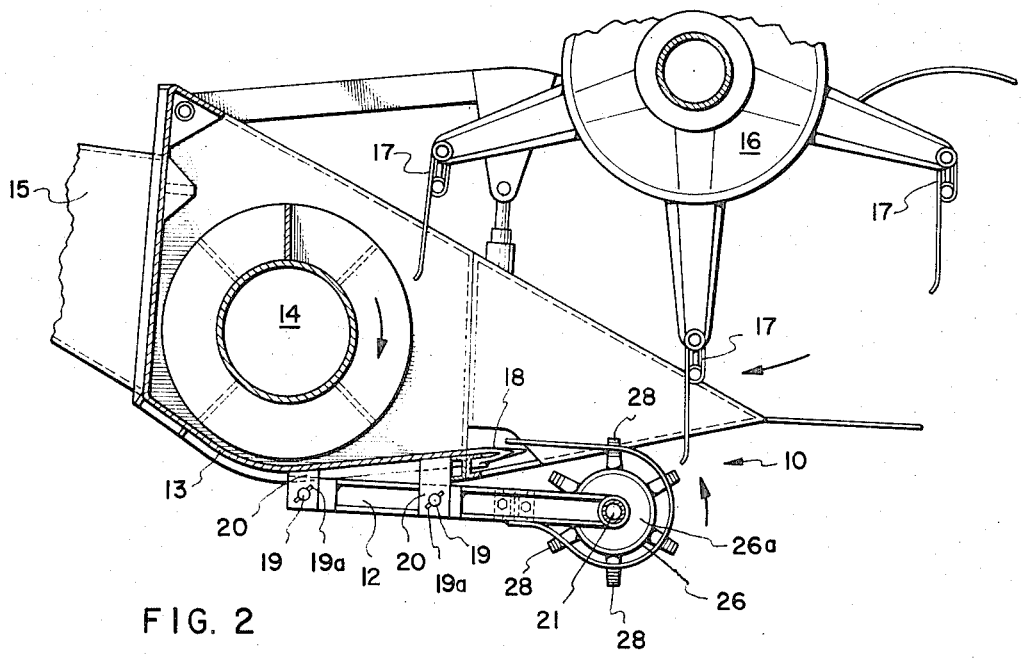
Figure 3:
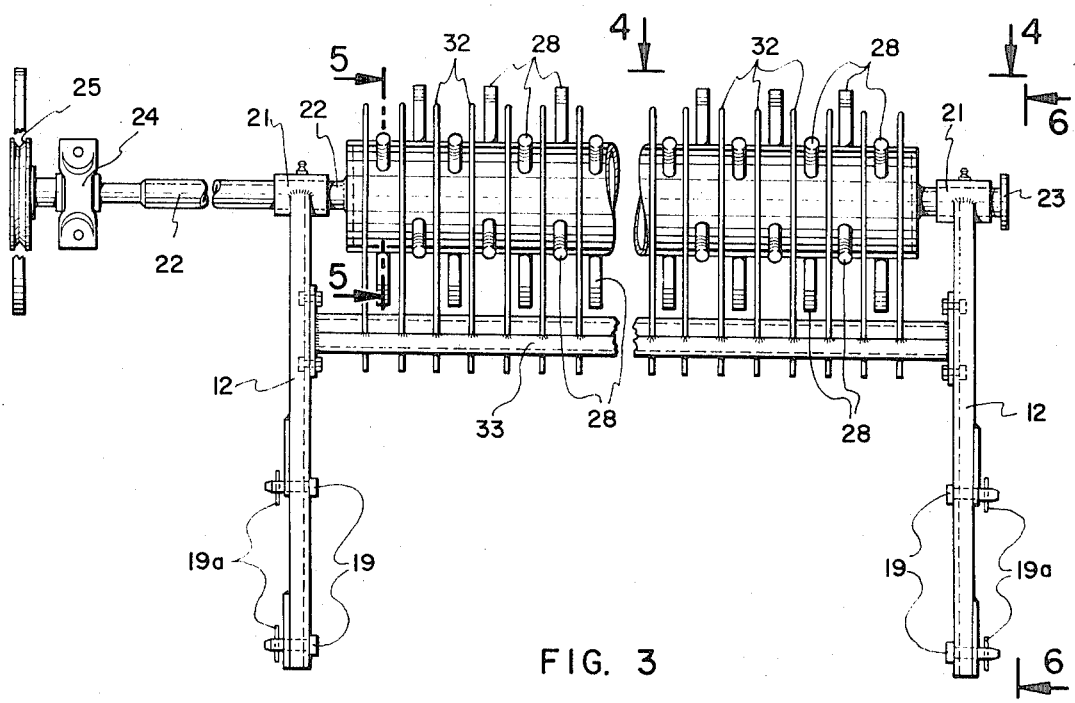
Figure 5:
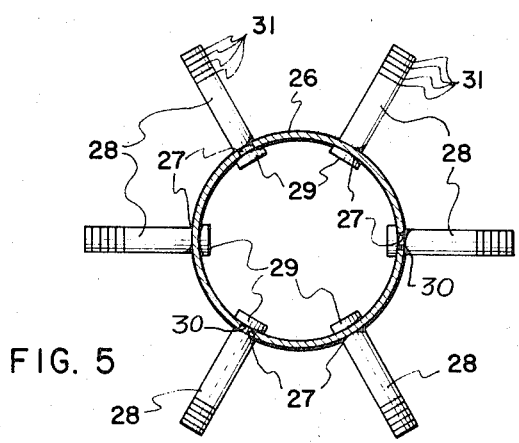
Figure 4:
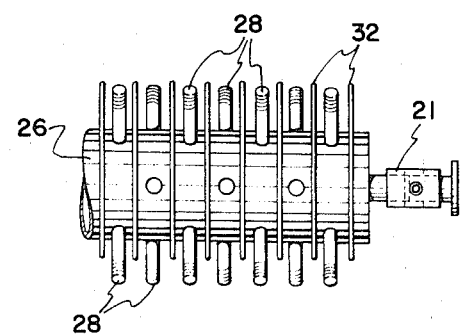
Figure 6:
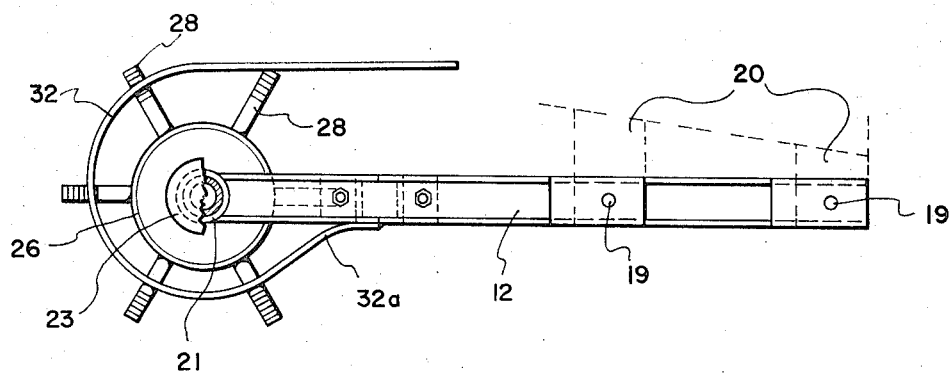

Driver pulley 25 has a V-belt, not shown, trained thereover. The belt is turned by any available conventional power source, not shown, on the combine 11. Axle 22 is turned reversely to the forward direction of travel of the combine wheels, or counterclockwise, as shown in FIG. 2. A cylinder housing 26, having closed end plates 26a welded or otherwise affixed to the axle 22, is mounted between the bearings 21.

Cylinder 26 is preferably formed having a thin outer wall and is capped on its ends by plates 26a and has a number of longitudinally aligned, transversely staggered holes 27 through the wall thereof. Each hole has a resilient finger 28 projecting therefrom. Each finger 28 is formed with an enlarged flexible head 29 at one end. The diameter of head 29 is somewhat greater than is that of each hole 27, such that after head 29 is folded and inserted through a hole 27, the head undersurface will return to its usual configuration and will extend across the hole to hold the finger therein. A groove 30 is formed around the end of each finger 28, adjacent to head 29. The edge of the groove 30 opposite head 29 forms a shoulder which abuts the edge of a hole 27, opposite to the side against which head 29 acts, to lock the finger in place.

The end of each finger opposite to head 29 has a number of shallow encircling grooves 31 formed therein. Each groove 31, when the cylinder housing 10 is rotated, acts as a guide to contact and comb upwards the grain carrying stalks of a crop through which the pick up unit is moved.

A plurality of spring guides 32 are each secured at one end 32a to a bar 33 that extends between the arms 12. Each guide extends downwardly beneath and partially encircles the cylinder 26 and is positioned between transverse rows of the outwardly projecting fingers 28. The ends of guides 32 opposite to bar 33 are unsupported and entend rearwardly, with respect to travel of the combine over the cutter bar 18. The guides somewhat limit bending of the fingers 28 and hold the cylindrical housing far enough above the ground that the fingers do not bend tightly against the housing and therefore are not sheared off. The guides 32 also assist in holding grain stalks upright as they are picked up by fingers 28 and as they are fed over the cutter bar 18.

In operation, the pick up unit 10 is connected to combine 11 through arms 12. Driver pulley 25 is turned through a belt, not shown, eminating from the combine 11. The housing 26 is rotated and as the combine moves the lowermost portions of the guides 32 slide over the ground. As the housing rotates and the combine moves forward, the fingers engage and pick up grain stalks and raise them. The guides 32, bats 17, and the fingers then move the stalks over the cutting bar. The stalks are then moved by auger 14 to the grain elevator in conventional fashion. Should a finger 28 contact a stone or the like it will bend to easily pass over or around the obstruction, and will then spring back to its original attitude.

While the pick up unit 10 has proven highly advantageous for moving grain stalks into a combine, it should be apparent that it can as well be used to pick up alfalfa, beans, peas, etc. or any other such crop that has been cut and is especially adapted to pick up of crops that have previously been placed in a winrow.

Although a preferred form of my invention has been herein disclosed, it is to be understood that the present disclosure is made by way of example and that variations are possible without departing from the scope of the hereinafter claimed subject matter, which subject matter I regard as my invention.

I claim:

1. A pick up unit comprising
   a cylindrical housing having a plurality of holes in spaced arrangement through the wall thereof;
   means for mounting the ends of said housing to a combine;
   means journalling said housing about its longitudinal axis;
   means for turning said cylinder;
   spaced, flexible fingers longitudinally aligned and transversely staggered in rows and projecting from the holes in said cylinder so as to project outwardly therefrom;
   means for securing each said finger within one of said cylinder holes, said means comprising an enlarged head on one end of each finger, and a groove adjacent thereto whereby the head and the edge of the groove opposite thereto engage opposite edges of a hole in the housing to secure the finger in place on the housing; and
   guide means for holding said housing off the ground, said guide means comprising a plurality of resilient members extending from a fixed end behind the housing, beneath the housing, partially around the housing and to a free end reaching rearwardly thereof, said transverse rows of fingers each being between pairs of said resilient members.

2. A pick up unit as in claim 1, wherein
   each of the fingers has encircling grooves formed in the end opposite the housing.

* * * * *